April 21, 1959 R. P. DIMMER 2,883,462

PARTY LINE PAYSTATION

Filed Aug. 18, 1954 4 Sheets-Sheet 1

INVENTOR.
ROBERT P. DIMMER
BY McWatters Owen
ATTY.

April 21, 1959 R. P. DIMMER 2,883,462

PARTY LINE PAYSTATION

Filed Aug. 18, 1954 4 Sheets-Sheet 2

INVENTOR.
ROBERT P. DIMMER

BY Wm Watts Owen

ATTY.

INVENTOR.
ROBERT P. DIMMER
BY Wm. Walter Owen,
ATTY.

April 21, 1959 R. P. DIMMER 2,883,462

PARTY LINE PAYSTATION

Filed Aug. 18, 1954 4 Sheets-Sheet 4

INVENTOR.
ROBERT P. DIMMER
BY Mc Walter Owen
ATTY.

United States Patent Office 2,883,462

Patented Apr. 21, 1959

2,883,462

PARTY LINE PAYSTATION

Robert P. Dimmer, Lombard, Ill., assignor to General Telephone Laboratories, Incorporated, a corporation of Delaware Application August 18, 1954, Serial No. 450,695

10 Claims. (Cl. 179—6.3)

Figure 1:
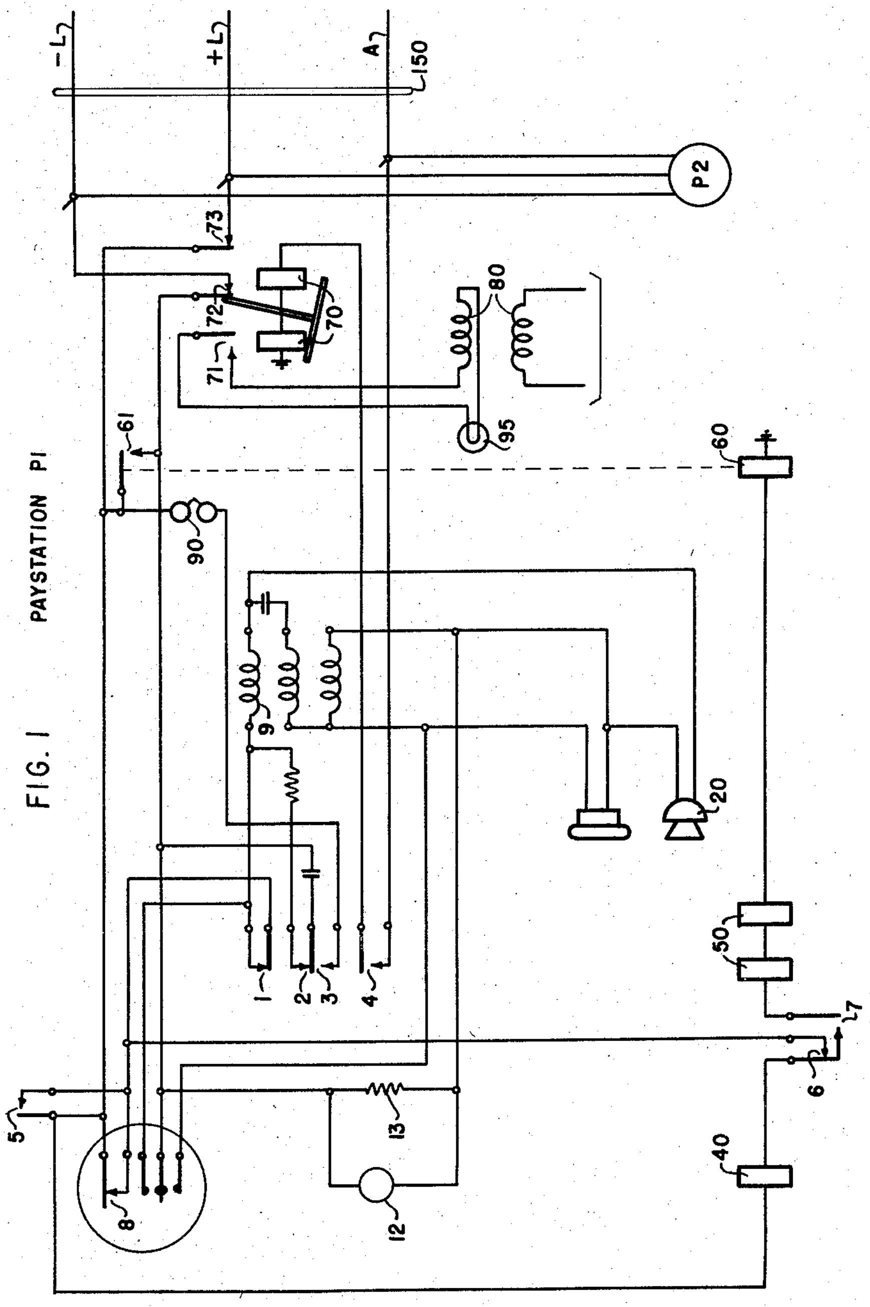

The present invention relates to telephone systems in general and in particular to a telephone system in which party line substations having measured service equipment are provided local, toll and reverting call service in an improved and economical manner.

Paystations have heretofore generally had an individual line for each station to the central office. Due to the increased need for party line paystations utilizing a common line for a number of stations, it has become necessary to provide additional equipment at the central office for controlling connections to and from the paystations to enable proper communication and coin control during ordinary local service, on calls to another subscriber on the same line and on toll calls. Thus secret service must be provided for each party on the line by locking out non-calling or non-called parties, the coin magnet at a particular station controlled at certain times for either a refund or collect operation and only an appropriate party on the line signalled when desirable. Such a system is provided in an invention disclosed in a copending application filed August 6, 1954 by Lomax, Serial No. 448,268.

The invention described in the aforementioned application necessitates the manipulation of a number of controls by an operator in completing either reverting or toll calls, and the inclusion of a number of jacks and circuits at each operator's board for each paystation party line for enabling a station on the line to be signalled and the coin magnet at a station to be controlled. It is therefore an object of the present invention to reduce the number of controls which need be exercised by an operator in completing toll or reverting calls to thus reduce the drain on her time and the possibility of error through operation of the wrong equipment. As most installations already provide control equipment at each operator's position for use by the operator in performing their various duties such as completing toll or reverting call connections and for controlling the coin magnet at individual paystation lines, it is an object of the present invention that the common dial and impulse sending equipment used for completing connections and the common high voltage coin battery controls for operating the coin magnet of a paystation having an individual line be utilized with party line paystations whereby savings and economies may be effected and further that all such controls be accomplished through the use of one jack for each paystation party line at the operator's board.

The present invention is therefore arranged to provide completely automatic service on local calls and reverting call and toll service in which calls are completed with the aid of an operator. A lock-out relay at each station is automatically controlled to provide secret service at the appropriate times, while automatic control of the coin magnet at a desired station is provided on a local call and on certain phases of a toll or reverting call. As only a few such paystation party lines are generally of use in any one exchange, a repeater, individual to the stations on one line, is provided through which local calls are completed and operator service is provided. This eliminates the need for providing equipment in all the common switching equipment having access to the lines and which are used only by the party line paystations. Thus the use of the individual repeater is dictated primarily by economic reasons. In any arrangement however the operator controls the completion of connections on toll and reverting calls and also exercises certain coin control functions incident thereto. The present invention enables these services to be provided by the same equipment at the operator's board which is used for other subscribers and thereby eliminates the necessity of having numerous jacks and cords for providing access to the repeater and the paystation party line to provide these services.

Fig. 1 discloses the details of one party line paystation circuit and shows the manner in which another paystation indicated by the reference character P2 may be connected to the same line. A total of four stations are to be considered as being connected to the line 150, although all are not shown, nor is the grouping necessarily limited to four.

Figure 2:
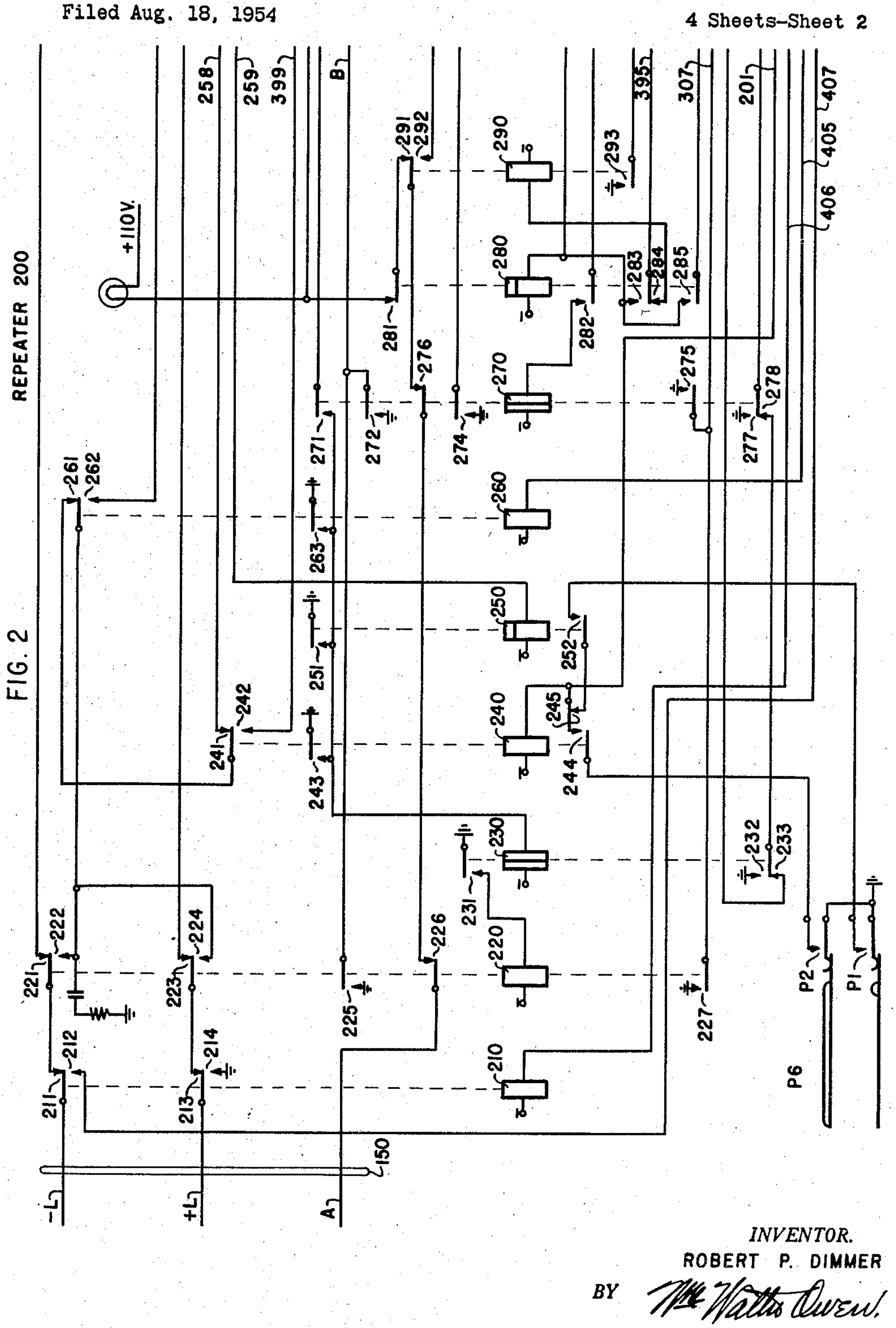
Figure 3:
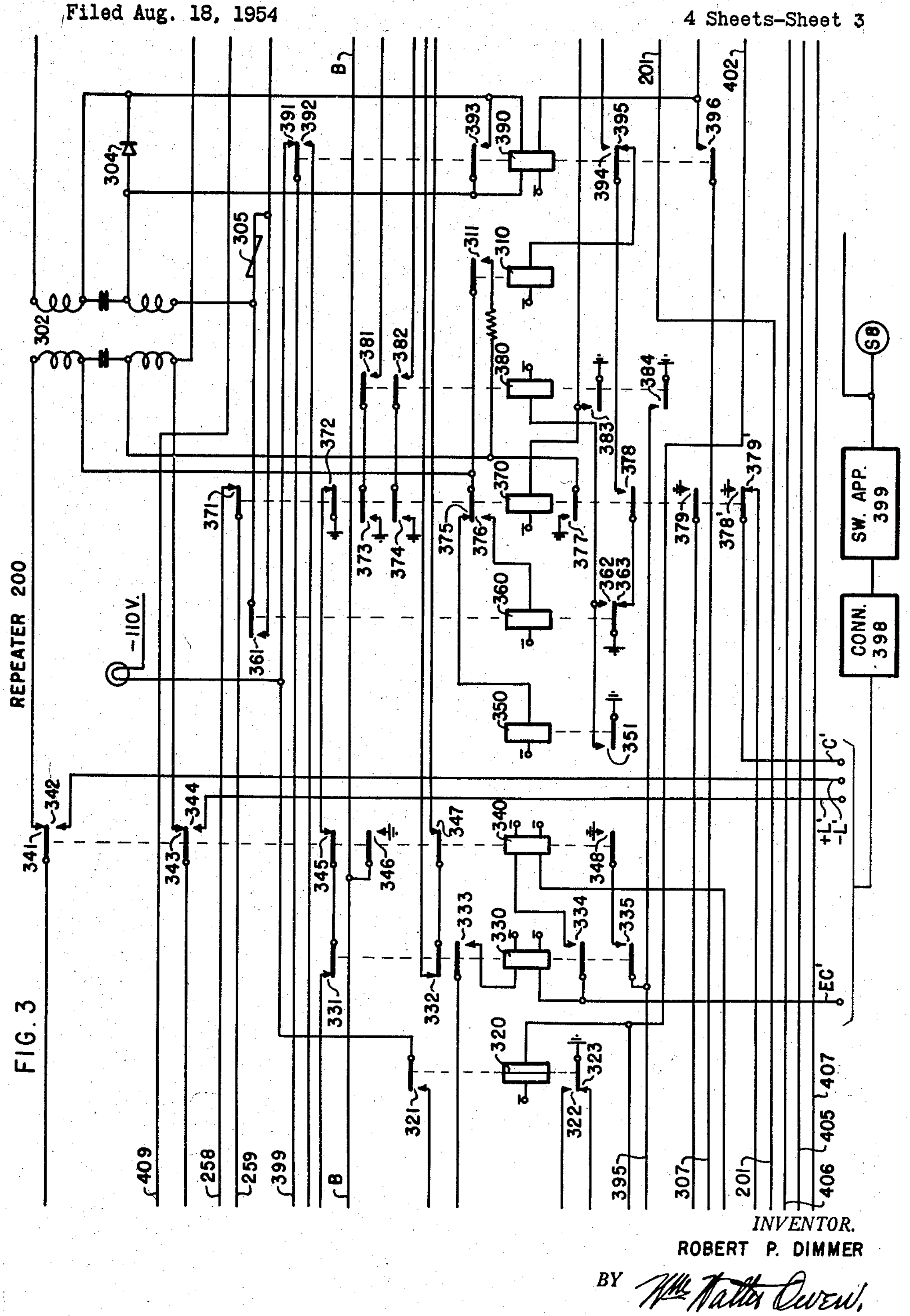
Figure 4:
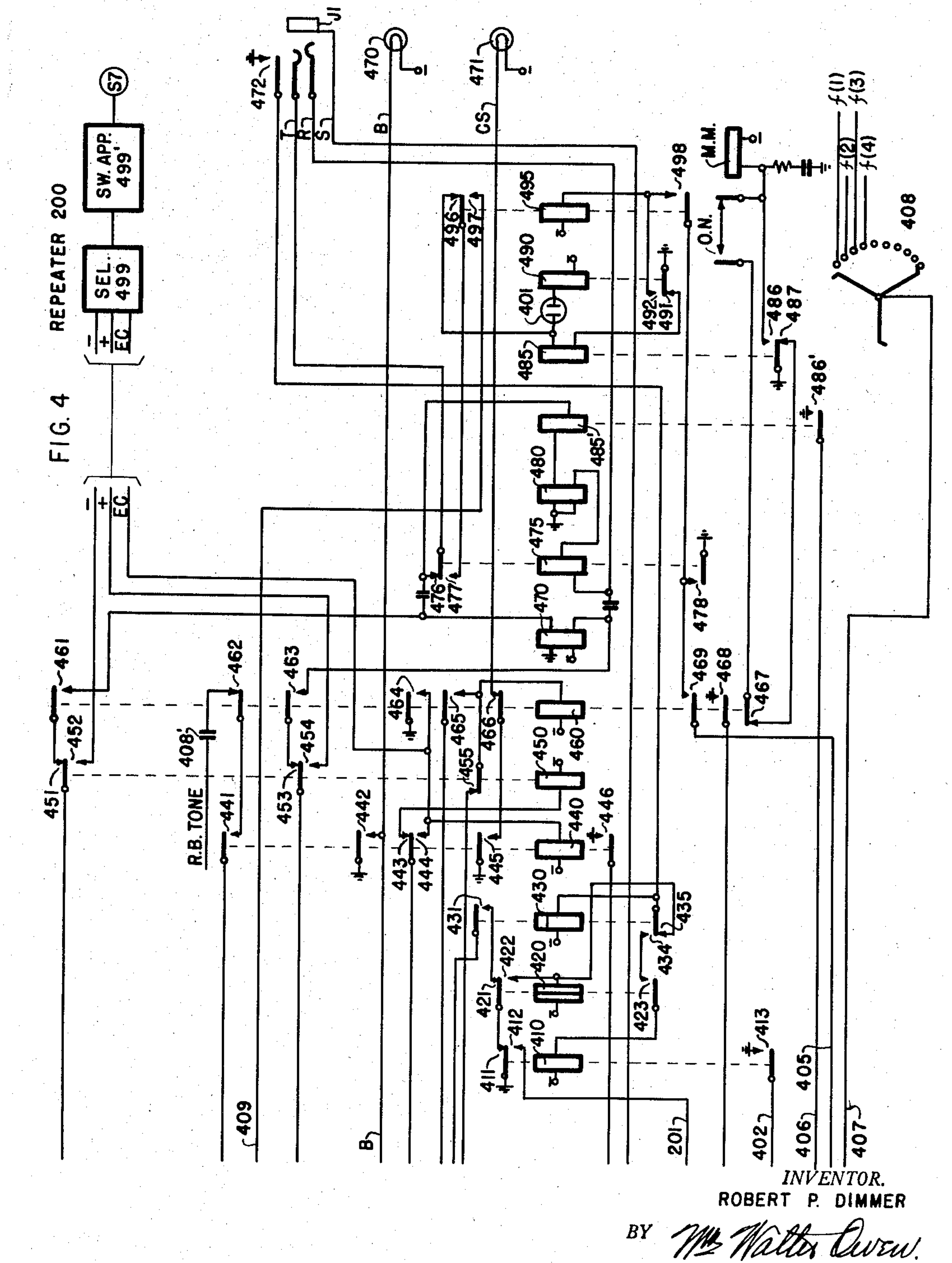

Figs. 2, 3 and 4 together disclose the repeater circuit 200, individual to the line 150 and therefore common only to the four stations on the line 150. A number of such repeaters may be provided in the exchange, one for each group of party line paystations connected to a single line, however for our purposes the description will generally proceed as though only repeater 200 is in use. The repeater circuit terminates at a number of operator positions, only one of which is indicated here by jack J1 in Fig. 4. At each position a cord circuit and dial equipment of any well-known type are available to the operator at the position for use with any number of trunks that terminate at her board. This equipment is also used in conjunction with the repeater 200 for controlling connections to and from a subscriber on the party line. The apparatus for extending calls to or from a subscriber on the party line is indicated by blocks 398 and 399 (Fig. 3) and blocks 499 and 499' (Fig. 4) respectively. This apparatus is the well-known Strowger step-by-step type switching apparatus which is arranged in a switch train comprising one or more selectors (dependent on the number of digits to be dialled) and a connector switch. It will be understood that the invention is not limited to use with this type of switching apparatus but may be used with numerous other types of switching apparatus. The control equipment shown in the repeater might of course be included in the well-known type of finder-selector links or other switches but is arranged in the disclosed manner as previously explained in the interests of economy.

A calling party initiates a call from one of the paystations in the usual manner by lifting his handset and depositing the proper coin value. The present invention is intended for use with a two nickel or one dime paystation mechanism such as disclosed in Patent No. 2,674,655, issued to Gallagher on April 6, 1954, wherein a calling party must deposit either one dime or two nickels before the dial springs 8 can be operated effectively. A restoring magnet 40 operated in conjunction with the coin magnet 50 opens the nickel springs 5 if they are not previously restored to normal while magnet 50 resets the other equipment to its original position on termination of a call. The repeater circuit 200, common to the four parties, is not seized until a first nickel is deposited. On seizure the repeater sends a momentary lock-out pulse over lead A to operate the lock-out relays corresponding to 70 at all stations on the party line for disconnecting all stations from line 150 except the calling station. The circuit to the calling station's lock-out relay is opened at springs such as 4. The lock-out relay may be any well-known polarized type relay having a permanent magnet for retaining the stay put armature 71 in the position to which it is thrown. In keeping with the general practice, +110 volt battery is used to operate the coin magnet such as 50 to collect a deposit and −110 volt battery is used to refund a deposit. The same potentials are used to operate the lock-out relays to the off or unlocked position and to the locked or on position respectively.

The repeater circuit in this instance has the Strowger selector switch 499 individual to the repeater 200. The first digit dialled by a party at a party line station desiring to call another party on the same line (reverting call) or toll is zero. The selector switch is thereby operated to the tenth level where its normal post springs (not shown) close contacts to return ground back to the repeater to cause the repeater to release selector 499 and signal the operator by lighting a lamp such as 471. Any other well-known type of means may be provided at the selector for returning ground in the event a reverting call is begun by dialling a predetermined digit other than zero. If the call is a local one, selector 499 is operated to some level besides the tenth, where it hunts for and seizes idle switching apparatus 499' (including a connector switch seized either after a second digit is dialled or after a first digit is dialled) in the well-known manner. The number of digits dialled is of course dependent on the size and arrangement of the system in which the present invention is utilized. The repeater is arranged to prevent interference by an operator on any call not routed to the operator. The switching apparatus is then operated by the necessary number of digits to connect to a desired called subscriber such as S7. Battery on the leads + and − in Fig. 4 is reversed by the connector on answer by the called party to operate relay 390, and on release of the call the repeater automatically operates the coin magnet at the calling station to collect the deposit and thereafter applies unlocking potential to the lock-out relays at all stations to connect the trunk conductors +L and −L to the locked-out stations. If any call is terminated by the calling party before answer by either the operator or a called party the repeater automatically causes the coin magnet at the calling station to refund the deposit and thereafter applies unlocking potential to the lock-out relays at all stations to connect the trunk conductors +L and −L of line 150 to the locked-out stations.

A busy lamp such as 470 at each operator's position is lighted, whenever the repeater is seized. If signalled by a lamp such as 471, as on a toll or reverting call, one of the operators inserts her plug in a jack such as J1 and completes a talking connection to the calling party. The repeater automatically sends high voltage coin potential back to the calling party's coin magnet for refunding a deposit immediately on insertion of the operator's plug. On securing the desired information, she completes the call, if it is a toll call, through her cord circuit (not shown). The cord circuit is of any well-known type having a coin control key associated therewith for applying high voltage collect or refund battery and also has associated therewith dial equipment and release and ringing equipment of any well-known type whereby a digit may be dialled while battery is placed on the ring conductor R and on operation of the release key causes the dial and attendant impulse sender to be released and removes battery from ring conductor R. Operation of the ringing key then applies battery over conductor T to operate relay 485' for the purpose of causing ringing current to be sent over the line. The result of these operations will be discussed in more detail as applied to the repeater and associated party lines. She may before extending the connection or at any time she has access to repeater 200 through jack J1 manually collect or refund coins through a coin control key associated with her cord circuit in any well-known manner.

On release of the toll call, the repeater which was thrown into the collect position by operation of relay 390 on answer by the operator, collects the coins that are on deposit.

If it is a reverting call, she instructs the calling party to hang up while she rings the called party. The operator further instructs the calling party to come back on the line within a prescribed time period. A stepping switch 408 of any well-known construction which steps its wiper on deenergization of the stepping magnet is provided for the purpose of being stepped in accordance with a digit dialled at the operator's dial equipment to a corresponding position. The dial impulses produced at the operator's position are forwarded over conductor T to pulse relay 485 which steps the switch 408 accordingly. As this system is arranged so that the ringers at the party line stations are responsive only to an individually corresponding harmonic ringing current frequency applied thereto, it is only necessary for the operator to dial the last digit of the called subscriber's number which corresponds to the individual ringing frequency to step the switch wipers to a corresponding contact. At each contact is connected a lead ($f1$—$f4$) having one of the individual ringing current frequencies thereon so that when the switch wiper is halted on a particular lead only that frequency will be forwarded over line 150 to operate the desired station ringer. To apply the selected ringing frequency current the operator first operates her release key to disconnect the dial equipment and then her ringing key all of which is standard equipment at the operator boards to cause a pulse to be sent out over lead A to operate the lock-out relays at all stations to their unlocked position so that their ringers are connected to line 150 while simultaneously the selected ringing current is sent over line 150 to operate the desired ringer and signal the called subscriber.

The operator is signalled by a cord circuit lamp (not shown) when either the calling or called party comes on the line and she may monitor to determine if the call is completed. If not she must manually refund by operating a refund key at her board to apply refund potential over conductor T and through jacks J1 and the repeater to the coin magnet of the calling party. If the call is completed, a collect potential is automatically forwarded by the repeater on release of the connection to operate the coin magnet at the calling party's station. The operator may of course initiate a call to one of the subscribers on line 150 without having first been signalled thereby. This is explained in the section on a Reverting Call.

Toll calls are completed with the aid of the operator through her cord circuit. She may of course refund or collect coins in a manner that will be described in detail in the section on a Reverting Call and may if the call is a delayed toll call allow the calling party line subscriber to hang up so that the repeater may be used by others. When she secures the called party, she will then extend a call to the calling party line subscriber as soon as the repeater is idle in a manner similar to that for securing a party line subscriber on a reverting call.

Reverse charge calls must be completed from an operator having direct access to repeater 200 through jack J1. She completes the connection through her cord circuit from the incoming toll operator by first signalling the desired station as described and requesting the proper coin deposit on answer by the called party line subscriber, which the repeater automatically collects on release of the connection.

Incoming calls from a local subscriber such as S8 or a toll operator, who need not secure a coin deposit from the called party, are completed over switching apparatus such as 399 and a connector such as 398. Connectors such as 398 having access to the paystation repeaters are arranged to provide harmonic ringing individual to the called station, through the repeater, on the dialling of a last digit on the connector. This arrangement is very generally used for connectors having access to party lines. For the purpose of illustrating the manner of operation of the invention, connector 395 is described as a three digit connector, although many other arrangements may be provided such as one wherein each connector having access to the party lines is arranged to provide a frequency individual thereto and individual to one station on the party line. The connector is of sourse seized after an appropriate number of digits are dialled over the selector switches included in switching apparatus 399. On a call directed to a party line, assuming a three digit connector is used, the first two digits control the connector to connect to the desired party line (in this case repeater 200) while the third digit controls the connector to select a frequency individual to the called station on the party line and apply the selected frequency to the line for signalling the called party. The repeater is busied to other incoming calls at the connector banks and to the operator and on answer by the called party automatically locks out the non-called stations.

*Outgoing local calls*

Whenever repeater 200 is idle, indicating that the handets at all stations are on their respective hook switches, positive 110 volt battery from Fig. 3 is returned over contacts 281, 291, 276, 226 and lead A, through springs 4 at station P1 and springs corresponding thereto at other party line stations and both windings of lock-out relay 70 and a relay corresponding thereto at each said stations to ensure that the lock-out relay at each station is in its off position. The stay put armature of each lock-out relay maintains contacts corresponding to 72 and 73 at each station closed so that the line conductors −L and +L are normally connected to each of the party line paystation circuits. A small permanent magnet associated with each stay put armature actually holds the armature in the off position, however the +110 volt battery is continuously applied to ensure its being brought into such position whenever proper as will be explained.

Removal of the handset at station P1 (assumed to be the calling party line station) from its hookswitch, closes springs 1 and 2 and opens springs 3 and 4. Opening of springs 3 removes the ringer 90 from across the line, while opening of springs 4 disrupts the previously described circuit for ensuring that relay 70 is in its off position. However, the previously described construction for relay 70 including the permanent magnet, maintains its armature in the position shown so that contacts 72 and 73 remain closed. No circuit is completed to the repeater 200 to enable completion of a call or operation of the lock-out relay at each other party line station to its on or locked position until a coin is deposited.

In accordance with the standard practice and as described in the aforementioned patent, shunt springs 5 are closed on the deposit of a nickel while coin springs 6 are opened and 7 closed. The deposit of a second nickel merely opens shunt springs 5. The deposit of a dime does not effect springs 5, however it does close springs 7 and open springs 6. The deposit of a first nickel completes a circuit from ground through relay 60, through coin magnet 50, springs 7, restoring magnet 40, springs 5 and 8 in shunt, springs 1, coil 9, voice transmitter 20, coin transmitter 12 and resistor 13 in shunt, contacts 72, the −L line, contacts 211, 221, contacts 341 in Fig. 3, the upper primary of repeating coil 302 in Fig. 3, contacts 375, through the winding of relay 350 to battery. Deposit of a dime completes the same circuit with the exception that springs 5 remain open.

Relay 350 only, being of high resistance, operates in this circuit to close contacts 351 and complete an obvious circuit to slow-to-release relay 380. Relay 380 closes contacts 381, 382, 383 and 384. At contacts 383 an obvious circuit is completed to relay 370 which operates to ground lead C′ at contacts 378′ and busy the repeater 200 to incoming calls from a connector switch such as 398. It also disrupts the previously described operating circuit for relay 350 at contacts 375 and completes a loop circuit for relay 360 over contacts 376, the upper primary of coil 302, contacts 341, 221 and 211, the −L line, the paystation loop comprising contacts 72, coin transmitter 12 and resistor 13 in shunt with each other, speech transmitter 20, coil 9, springs 1, dial springs 8 and springs 5 in shunt (if only a nickel has been deposited) and contacts 73, and then back over the +L line, contacts 213, 223, 343, the lower primary of repeating coil 302 to ground at contacts 377. Excepting shunt springs 5, which are included only on an incoming call, this circuit comprises the paystation talking circuit whereby speech currents are transmitted through repeating coil 302 at the appropriate time. It will be noticed that the ground on the +L line now shunts restoring magnet 40, coin magnet 50 and relay 60. Springs 5 are effective if only one nickel has been deposited to prevent the transmission of dial pulses to pulse the selector line relay (not shown) in a manner to be described. Deposit of a second nickel simply opens springs 5 to permit effective operation of the dial while deposit of a dime in place of the two nickels results in the operation of relays 350, 380, 370 and 360 as previously described with the exception that shunt springs 5 are not closed at any time. Also at contacts 378′ ground is forwarded over lead C′ to busy the repeater 200 to incoming calls from connector 398.

Returning momentarily to contacts 384 closed by relay 380, it will be seen that a circuit was completed over lead 395 and contacts 284 to relay 290. Relay 290 operated to open contacts 291 and remove the +110 volt potential from lead A and to close contacts 292 to prepare for the application of −110 volt potential to the lock-out relays at stations other than P1. At contacts 293 it completes an obvious circuit to slow-to-release relay 320 which closes contacts 321 to apply −110 volt potential over contacts 292, 276 and 226 to lead A for operating the lock-out relay corresponding to relay 70 at the non-calling stations to their lock-out position. As the hookswitch springs at each non-calling station are unoperated the circuit to each lock-out relay is completed over springs corresponding to 4 at those stations. The lock-out relay at each non-calling station then operates its armature to a position opposite to that shown in Fig. 1 to open contacts corresponding to 72 and 73 and close contacts corresponding to 71 at those stations. The armature of each lock-out relay remains in that position for the reasons previously described. It is now impossible for a subscriber at any of the other stations to remove his handset from the hookswitch and deposit any coins to complete a circuit to relay 350 in the repeater nor can he at his own discretion be connected to the +L and −L leads or otherwise interfere with a call. Contacts corresponding to 71 on closing complete a circuit through the secondary of a transformer such as 80 to provide power from a commercial source at each paystation for lighting a lamp such as 95 so that any party desiring to make a call from a locked-out paystation is warned that the particular station is locked-out and it is futile for him to initiate a call.

Relay 320 also completes an obvious circuit for slow-to-operate relay 280 at contacts 322 which operates to open contacts 281 and at contacts 282 prepares a circuit to slow-to-release relay 270. At contacts 284 it opens the previously described operating circuit for relay 290 and it releases. At contacts 283, relay 280 completes a holding circuit for itself over conductor 395 from ground at contacts 384. An alternate holding circuit for relay 280 is completed over contacts 285 and previously closed contacts 379. When relay 290 releases, contacts 292 open to remove −110 volt potential from lead A, however the lock-out relays remain in the respective position to which they are operated for the reasons already given. The +110 volt battery is not applied to lead A when contacts 291 close, however as contacts 281 are still open. Contacts 293 open to break the circuit to relay 320 which restores after a period of time to disconnect the —110 volt potential at contacts 321, open the original operating circuit to relay 280 at contacts 322 and completes as previously prepared circuit to relay 270 over contacts 323 and 282. At contacts 276 another point is opened in the high voltage circuit to lead A. At contacts 271 a point is prepared in a circuit to relay 230 and at contacts 272 a circuit is completed over lead B for lighting busy lamp 470 at each operator's board for indicating to each operator that this particular repeater is busy.

Returning now to operated relay 370 it will be noticed that a circuit was completed before relay 360 operated from ground at contacts 363, over contacts 378 and 395 to relay 310. Relay 310 operated to close contacts 311 and provide a circuit for aiding the energization of relay 360 over contacts 377, resistor 303, contacts 311 and 376. Resistor 303 is of high enough resistance to prevent the current in this circuit from operating relay 360 or holding it operated but does allow the passage of enough current to aid in its energization. When relay 360 does operate it opens the energizing circuit for relay 310 at contacts 363 which in turn opens the circuit for aiding the energization of relay 360 at contacts 311. Relay 360 at contacts 362 provides another energizing circuit for slow-to-release relay 380 as its original operating circuit is opened at contacts 351 when relay 350 releases. Relay 380 maintains its contacts operated in the interim however as it is slow-to-release. Also before relay 360 operates, relay 370 at contacts 373 completes a previously prepared circuit to relay 450 over contacts 381 and 443 which relay operates to close contacts 452 and 454 to connect the secondary of repeating coil 302 to the line relay (not shown) of selector 499 through the silicon carbide resistor 305. The silicon carbide resistor prevents the selector line relay from operating. Relay 450 also opens contacts 451, 453 and 455 to prevent an operator connecting to line 150 if she plugs into jack J1 inadvertently.

Relay 360 now operating closes contacts 361 to complete an energizing loop circuit for the selector line relay from ground on one side of the line relay over the + trunk lead, contacts 454, contacts 361 (shunting silicon carbide resistor 305), the lower secondary winding of repeating coil 302, rectifier 304 shunting the upper winding of relay 390, the upper secondary winding of coil 302, contacts 452, the — trunk lead to battery on the other side of the selector line relay. Dial tone may now be returned from selector 499 in the well-known manner over one of the trunk leads, repeating coil 302 and the line loop back to the calling party to inform him that the selector is seized and that he may initiate dialling.

The calling party (assuming the proper coin value is deposited) operates his dial to open and close dial springs 8 a number of times corresponding to the digit dialled. This opens and closes the previously described loop to relay 360 a corresponding number of times and it releases and energizes a corresponding number of times. Relay 360 on releasing closes the previously described circuit to relay 310 which energizes to complete the previously described circuit for aiding the energization of relay 360 after each release so that relay 360 is fully energized when the dial springs 8 reclose after each opening. This special energizing circuit is provided because relay 360 is in a high resistance line, and would therefore tend to have an excessive release period. The selector line relay is pulsed at contacts 361 so that the selector is operated in the well-known manner to the position corresponding to the digit dialled. The silicon carbide resistor 305 bridged across the pulsing springs 361 slightly delays the release of the selector line relay when contacts 361 open as the selector line relay provides an inductive kick that lowers the resistance of the resistor momentarily. The resistor also serves to protect the pulsing springs 361. Its use is preferred to that of a condenser which may discharge and quicken the release of the selector line relay. This can be a problem in the case of a slow dial, as relay 360 provides a long open pulse due to its being in a high resistance line.

Assuming that this is a local call, the selector 499 is operated to any level but the tenth on the first digit and then hunts for and finds, in the well-known manner, an idle selector or connector switch such as is indicated by the block marked switching apparatus 499' and extends an energizing loop including the secondary of coil 302, contacts 361 and the + and — leads respectively to the line relay (not shown) of the next switch. A series of digits then dialled by the calling party operates relay 360 a corresponding number of times to in turn open and close contacts 361 correspondingly and operate the following switching equipment 499' including a connector to a position corresponding to the series of digits dialled. It then connects to a local subscriber such as S7, applies ringing current to the called line and returns ring back tone back over the connector energizing loop, repeating coil 302 and the loop back to the calling party, if the line of subscriber S7 is idle. The calling party then knows the called party is being rung. Otherwise busy tone is returned over the described loop to indicate that the called subscriber's line is busy. The called party on answering causes the connector to reverse battery on the + and — leads in the well-known manner. When battery is reversed, rectifier 304 no longer shunts the upper winding of relay 390 and it operates in series with the energizing loop to the connector line relay to open contacts 391 and 395 and close contacts 392, 393, 394 and 396. Contacts 393 now shunt the upper winding of relay 390 and it deenergizes, however the lower winding of relay 390 is now energized over contacts 396, conductor 307 and contacts 275 to ground to maintain the contacts of relay 390 operated. Contacts 395 now maintain an open point in the circuit to relay 310 and at contacts 392 a point is prepared in a circuit to provide collect potential to the coin magnet 50 at the calling paystation.

If the called party does not answer for any reason, or if the calling party has not operated the selector or succeeding switches, battery is not reversed on the + and — leads, and relay 390 is not operated. The calling party on replacing his handset opens hookswitch springs 1 and closes 4 to respectively open the loop to relay 360 and reconnect lock-out relay 70 to lead A. Relay 360 releases to release the selector switch line relay at contacts 361 and the selector releases. At contacts 362 the circuit to relay 380 is opened, and it releases after a period of time to in turn release relay 370 at contacts 383. Relay 310 is energized over its previously described energizing circuit but as before explained does not operate relay 360. Relay 380 also opens one of the holding circuits to relay 280 at contacts 384 and at contacts 381 opens the circuit to relay 450 which restores to disconnect the secondary of coil 402 from the + and — leads. Relay 370 on releasing opens another holding circuit to relay 280 at contacts 379 and relay 280 releases to close contacts 281 to prepare a point in the circuit for placing +110 volt battery on lead A and at contacts 282 opens the circuit to relay 270 which being slow-to-release does not yet restore. Contacts 377' on opening remove ground from lead C', however contacts 378' close to maintain lead C' grounded to busy the repeater at contacts 277.

Relay 370 on releasing also closed contacts 372, before relay 270 is released to complete a previously prepared circuit over contacts 345, 331 and 271 to operate slow-to-release relay 230. Relay 230 operates to complete an obvious circuit for relay 220 at contacts 231. Relay 220 operates and opens another point in the previously described lock-out circuit at contacts 226, and at 225 maintains lamp 470 lighted over lead B. It also closes contacts 227 for no purpose. At this point it would be well to mention that contacts 232 on closing will keep the repeater busy at the connector banks by supplying ground over contacts 278 (after relay 270 releases) and 378′ to the lead C′ and likewise by opening contacts 233 prevent the completion of a circuit which will be described from a connector to relay 340. Contacts 226 are opened because relay 270 will shortly close contacts 276 and thereby attempt to forward +110 volt unlocking battery over lead A, and contacts 225 maintain the circuit to lamp 470 when contacts 272 open. Relay 220 closes contacts 224 to complete a circuit to slow-to-operate relay 250 from battery on the left side of relay 250, conductor 259, contacts 371, conductor 258, contacts 241, contacts 261, contacts 224, the +L line, restoring magnet 40, coin magnet 50, and relay 60 to ground. Relay 250 operates to close contacts 251 to provide another operating circuit for relay 230 as relay 270, when completely restored, opens the original operating circuit for relay 230 at contacts 271. At contacts 252 it prepares a circuit from the pulse sender P6 which is common to all repeaters such as 200 and is continuously operated.

When contacts P1 associated with the lower cam of the pulser P6 are closed ground is forwarded over contacts 252 and 245 to operate relay 240. Relay 240 operates to close contacts 243 to provide another holding circuit for relay 230 and closes contacts 244 to complete its own holding circuit from ground on contacts P2 which are held closed by the upper cam of pulser P6 for a predetermined time. It also opens its own previously described operating circuit at contacts 245, and at contacts 241 opens the previously described operating circuit for relay 250 which releases.

Relay 240 on operating closes contacts 242 so that −110 volt refund potential is applied over contacts 391, conductor 399, 242, 261 and contacts 222 and 224 and 211 and 213 respectively to both the −L and +L conductors. As the hookswitch springs 1 are open, the −110 volt potential extends only over the side of the paystation circuit connected to the +L line, restoring magnet 40, coin springs 7, coin magnet 50, coin magnet 50 and relay 60 to ground. Relay 60 being of high resistance operates first, to close contacts 61 to now apply the −110 volt potential from both sides of the line to insure the full operation of coin magnet 50 and restoring magnet 40. The restoring magnet operates to reset springs 5 if only one nickel were deposited and the coin magnet 50 operates to refund the deposited coin or coins and reset springs 6 and 7 all in the well-known manner. It will be noted that as the +L and −L conductors of line 150 are disconnected from the other paystation circuits, that coin magnet 50 receives its full operating voltage.

As previously described if the call had been completed relay 390 is operated. On termination of the conversation the calling party replaces his handset and the loop to relay 360 is opened as before described to initiate the afore-described sequence of operations. Relay 390 is held operated after release of relay 270 by ground at contacts 227 forwarded over conductor 307. Now when contacts 222 and 224 close, +110 volt collect potential is applied, as contacts 391 are open and contacts 392 are closed, over the afore-described coin magnet circuit to operate relay 60, coin magnet 50 for a collect operation and restoring magnet 40.

When the pulser completes one cycle of operation, which occurs during a predetermined time period, ground is removed from contacts P2, and relay 240 releases to open the circuit to relay 230 at contacts 243, and it in turn releases. Relay 240 is prevented from reoperating when the pulser goes through another cycle as the circuit to relay 250 is now opened at coin springs 7. As magnet 40 and 50 operate together, a failure on their part to operate and open springs 7 initiates another cycle of operations for applying coin potential to the coin magnet for disposing of an undisposed coin as relay 250 is again operated. Relay 230 releases after a short period of time to make the repeater available to incoming calls by removing ground from lead C′ at contacts 232 and restores relay 220. Relay 220 on restoring opens the holding circuit for the lower winding of relay 390 so that it restores. At contacts 225 the circuit to lamp 470 is opened so that it darkens to indicate the repeater is idle and at contacts 226 the +110 volt unlocking potential is forwarded from contacts 281, 291 and 276 to lead A to unlock the lock-out relay at each station. If a party at another station had lifted his handset after the momentary lock-out pulse sent at the beginning of the call, it will be noticed that he cannot be locked out indefinitely for the unlocking pulse is sent continuously by the repeater at the end of a call to ensure that whenever a party at the other station replaces his handset he will receive the unlocking pulse and be enabled to initiate or receive a call.

*A reverting call*

This type of call is initiated in the same manner as described for a local call to a subscriber on another line, namely; by lifting the handset and by deposit of the appropriate coin value to operate the same relays over the same circuits as previously described for seizing the selector 499. Thus at the time selector 499 is seized relays 360, 370, 380, 450, 280 and 270 are operated. The calling party to reach another party on the same line dials the digit zero and thereby operates the selector to the tenth level. The selector causes ground to be returned over lead EC in any well-known manner from contacts closed by the selector normal post springs to operate relay 440, which closes contacts 441 to provide ring back tone over condenser 408′, contacts 462, 441, 343, 223 and 213 to the +L lead back to the calling party's receiver so that he is informed that a signalling operation is taking place and that he should not continue to dial. Contacts 442 close to complete another circuit over lead B for holding lighted busy lamp 470 and corresponding lamps at each operator's position. A holding circuit is also completed for relay 440 over contacts 373, 381 and 444. At contacts 445 a circuit is completed over contacts 466 and lead CS for lighting the call lamp 471 and lamps corresponding thereto at each operator's position so that they are signalled and one of them answers the call. At contacts 443 the circuit to relay 450 is opened, and it releases to open the energizing loop to the selector line relay at contacts 452 and 454, so that the selector releases in the well-known manner. At contacts 446 a holding circuit for relay 370 is provided. Relay 450 on releasing now prepares a circuit at contacts 451 and 453 from the secondary of coil 302 to the windings of 470, and at contacts 455 prepares a circuit to relay 460 to be completed, when the operator answers.

The operator inserts her plug at jack J1 to close contacts 472 and forward ground to slow-to-operate relay 430 and to slow-to-release relay 420 over contacts 435. Relay 420 operates to close contacts 421 to complete its own holding circuit from ground at contacts 411, and at contacts 423 prepares a circuit to relay 410. Relay 430 now operates to prepare a circuit to relay 460 at contacts 431, open the original operating circuit for relay 420 at contacts 435 and complete a circuit to relay 410 over contacts 472, 434 and 423. Relay 410 operates to open the holding circuit to relay 420 at contacts 411. At contacts 412 a circuit is completed over conductor 201 to relay 240 which operates. The pulser may be in operation when relay 240 closes contacts 244, and a previously described circuit may be completed therefrom. At contacts 243 an obvious circuit is completed to slow-to-release relay 230 which in turn operates relay 220. Simultaneously with the operation of relay 240, ground is forwarded over contacts 413 and conductor 402 to relay 320 and it operates to open the circuit to relay 270 at contacts 323, and it starts to restore while at contacts 322 another operating circuit for relay 280 is provided. The −110 volt potential now at contacts 321 is not applied to the lead A as contacts 292 are open. Relay 220 functions as previously described to open a point in the circuit to the lock-out relays at contacts 226, and at contacts 222 and 224 causes −110 volt potential to be forwarded from contacts 391, 242 and 261 to the −L and +L conductors respectively to operate the coin magnet at the calling station for thus automatically refunding a deposited coin or coins. It also energizes the lower winding of relay 390 over contacts 227 and conductor 307. Now when relay 420 finally restores after its holding circuit was opened at contacts 411 it opens the circuit to relay 410 at contacts 423. Relay 410 releases to open the just described operating circuit for relay 240. It may be held operated for a short time longer if the pulser is in the midst of a cycle, that is until the end of the cycle before releasing. Relay 240 opens the circuit to relay 230 which in turn opens the circuit to relay 220. When relay 220 operated it opened the operating circuit for relay 360 at contacts 221 and 223. The circuit to relay 380 is opened at contacts 362, but as it is slow-to-release, it does not restore before relay 220 restores to recomplete the circuit to relay 360 which in turn reestablishes the circuit to relay 380. If relay 380 does restore, it opens the circuit to relay 440 at contacts 381, and relay 370 also releases as contacts 383 and 446 are then open. Relays 380 and 370 being released, the holding circuits for relay 280 are opened at contacts 384 and 379 respectively. Contacts 281 do not close to forward +110 volt potential to the A lead as relay 280 is maintained operated at contacts 322. Relays 380, 370, 360 and 440 will be reoperated after relay 460 operates as will be explained and before relay 320 releases, to reestablish the holding circuits for relay 280. Relay 270 may be fully restored, before relay 410 restores to open the circuit to relay 320, but as relay 320 is slow-to-release it maintains 280 operated until its origonal circuits are reestablished so that +110 volts cannot be forwarded to lead A. It must also be noted that slow-to-release relay 230 gets an extra energizing jolt before slow-to-release relay 270 releases, if 370 restores, over contacts 372, 345, 331 and 271. It maintains 220 operated correspondingly to hold lead A open at contacts 226. Therefore relays 220 and 230 will not release until relay 370 is operated, even though relay 270 is restored as relay 230 is slow-to-release. Relays 220 and 230 which maintain the busy lamp 470 lighted and the repeater busy respectively perform the functions of relay 270.

Relay 410 and 420 now being restored and relay 430 being operated results in the completion of a circuit to relay 460 over contacts 411, 421, 431, 332, 347 and 455. It operates and at contacts 462 opens a point in the circuit for providing ring back tone, at 464 completes a circuit to relay 440 and at contacts 466 opens a point in the circuit to the answer lamp 471. At contacts 467 it opens a point in the homing circuit of the motor magnet M.M. while at contacts 468 it completes a circuit to the lower winding of relay 390 which operates. Contacts 469 close to prepare a circuit to relay 260. The circuit completed to relay 440 is an auxiliary circuit which ensures operation in the event it had been released due to relay 380 restoring. In the event the previously discussed relays 380, 370 and 440 were restored it reoperates relay 370 at contacts 446. Relay 370 operates to reoperate 360 over the previously described paystation loop as soon as relays 230 and 220 restore with the exception that as coin springs 7 are open the station coin magnet and relays are not connected to the loop and springs 5 shunt dial springs 8. The operator's cord lamp may momentarily light before relay 360 operates over a circuit from ground at contacts 363, 378 and 394 and the sleeve conductor S of jack J1. Relay 360 opens this circuit and reoperates relay 380. A circuit for relay 280 is completed as soon as relay 370 reoperates over contacts 379 and 285 as relay 280 is still held operated by slow-to-release relay 320. Relay 380 operating after 360 also completes a circuit to relay 280 over contacts 384 and 283. Relay 320 now releasing operates relay 270. The −110 potential is not sent out over lead A as contacts 321 open. Relay 460 completes its own holding circuit from ground at contacts 374, 382 and 465. At contacts 466 it maintains an open circuit to all answer lamps so that they remain extinguished.

The secondary of coil 302 is now connected to battery and ground respectively through 470 over contacts 463, 453 and 361 (shunting resistor 303) and contacts 461 and 451 respectively. Rectifier 304 is shunted by contacts 393 and the calling party may now converse with the operator over coil 302 and condenser 403 and 404. The operator instructs the calling party to deposit the appropriate coin value which she may identify from tones generated by the coin transmitter 12 and transmitted over the talking circuit and secures the number of the called party. She then instructs the calling party to hang up and come back on in a few moments. The calling party on hanging up may release relay 360 as it will be in a high resistance circuit with the coin magnet to in turn release relay 380, but relays 430, 460, 440, 390, 370, 280 and 270 remain operated. The cord lamp (not shown) lights over contacts 363, 378 and 394 to indicate that no one is on the line. The operator now dials a digit on the dial equipment corresponding to the last digit of the called party's number as this indicates his ringing frequency. On initiation of the dialling operation, battery is placed on ring conductor R in any well-known manner through relay 475 and the lower winding of balancing impedance 480. Relay 475 operates and closes contacts 478 to forward ground over contacts 469 and conductor 405 to operate relay 260 which closes contacts 262 and 263. Contacts 263 complete an obvious circuit to relay 230 which in turn operates relay 220. Contacts 262 close without effect as the circuit from ground through the coin springs to contacts 262 and conductor 409 is open at contacts 497. High voltage is not forwarded over the line conductors at this time as contacts 242 are open because relay 250 is not operated to operate relay 240. Relay 485 is now pulsed in accordance with the dialled digit over the tip conductor T, contacts 477, 496, the winding of relay 485 and ground at contacts 492. It follows the dial pulses and opens and closes contacts 486 a corresponding number of times. The motor magnet M.M. is energized once for each closure of contacts 486 and steps its wipers on each deenergization so that the wiper eventually is halted on a contact corresponding to the digit dialled. The off-normal springs O.N. close to prepare a homing circuit for the motor magnet which is not completed now as contacts 467 are open. The ringing current frequency on one of the leads *f*1, *f*2, *f*3 or *f*4 is now set up, and the operator presses her release key to remove battery from the ring conductor and release relay 475. Contacts 476 now close and 478 open to restore relay 260. It in turn restores relay 230 which releases relay 220 so that the line conductors are now connected to coil 302 and relay 360. On pressing her ringing key the operator applies battery over the tip conductor T and contacts 476 through the upper winding of balancing impedance 480 to operate relay 485′. It closes contacts 486′ to forward ground over conductor 406 and operate relay 210. Relay 210 closes contacts 212 and 214 to prepare the station ringers for the application of ringing current and disconnect the line conductors from coil 302 and relay 360. At contacts 215 it forwards +110 volts over contacts 273 and 226 to lead A and the lock-out relays to operate their respective armatures to their unlocked position where all contacts corresponding to 72 and 73 are closed to connect their respective stations to the line conductors. Ringing current individual to the called party is now sent out from the selected contact of the stepping switch 408 over the wiper of 408 and conductor 407 and contacts 212 to operate the ringer corresponding to 90 at only the called party's station. The called party on being signalled by the operated ringer comes on the line, while simultaneously or nearly so the called party comes back on the line as per instruction. The ringing key is only operated momentarily so that relay 485' is likewise momentarily operated, and on its release, it releases relay 210 to reconnect the line conductors to the coil 302 and to relay 360. In the event the called party does not answer immediately, he may be rung again by simply pressing the ringing key. If the calling party lifts his handset, he will be connected to coil 302 and relay 360 during the period when 210 is restored, so that he may be instructed that the calling party has not answered yet, and appropriate action may then be taken for either continuing to ring or refunding the deposit. Whenever anyone comes on the line and is connected to relay 360, the cord lamp is extinguished at contacts 363 to signal the operator.

It will be observed that an operator may initiate a call to one of the stations associated with repeater 200 without having first been signalled by a calling party. She initiates a call to a subscriber on line 150 simply by inserting her plug in jack J1 to operate relays 420, 430 and 410 as previously described. Relays 240 and 320 are operated by relay 410. Relay 320 operates relay 280 as described while relay 240 operates relay 230 and 220 in turn. Relay 220 lights busy lamp 470 while 230 busies the repeater to incoming calls. Relays 220, 320 and therefore 280 being operated, no high voltage is applied to lead A, while relay 240 being operated causes −110 volt refund potential to be applied to the line conductors +L and −L over contacts 391, 242, 261 and 222, and 224 respectively to refund any coin on deposit. Relays 420 and 410 releasing now complete a previously described circuit to relay 460 and it operates to operate 440 and 390. Relay 440 in turn operates relay 370 to complete a previously described holding circuit to relay 280 over contacts 379 and 285. This occurs before restoration of slow-to-release relay 320 whose circuit is opened on release of relay 410. Relays 230 and 220 remain operated for a short time longer as relay 240 must restore first. In the meantime relay 320 restores to operate relay 270 so that the no high voltage is applied to lead A, the busy lamp 470 remains operated and the repeater is maintained busy after relays 240, 230 and 220 restore. The operator now dials the last digit of the desired subscriber's number to set up the ringing frequency as previously explained on switch 408. She then sends out the desired frequency by operating relay 485' to in turn operate relay 210 which unlocks all stations as described and forwards the ringing frequency over the line conductors to signal the desired station. The cord lamp which is lighted over a previously described circuit is extinguished when the called party answers and operates relays 360 and 380.

If the called party does not answer on a reverting call, the operator after instructing the calling party to replace his handset must refund the deposit. The calling party on hanging up opens the circuit to relay 360 to operate the cord lamp, and thereby inform the operator that he has replaced his handset. She operates her coin key to the refund position so that battery is placed on the ring conductor R to operate relay 475 as previously described and relays 260, 230 and 220 in turn operate. A −110 volt potential placed on the tip conductor T at the same time is forwarded over contacts 477 to operate relay 485 as described. The high voltage also causes neon lamp 499' to break down and conduct so that relay 490 is energized. It opens the circuit to relay 485 at contacts 492 and operates relay 495 over contacts 491. The motor magnet which was energized when relay 485 was operated now deenergizes and steps its wipers to the next contact. Relay 495 opens contacts 496 to open the circuit to relay 490 and it releases while the lamp 499' deionizes. Relay 495 completes its own holding circuit over contacts 498 and 478. A circuit is now completed over contacts 477, 497, conductor 409 and contacts 262, 222 and 224 for applying the −110 volts over the +L and −L conductors to operate the relays and coin magnet at the calling station for a refund operation in a manner previously described. The high voltage remains on the line as long as the operator maintains her refund key operated. A lamp (not shown) associated with the tip conductor T is lighted as long as springs 7 at the pay station are closed indicating the deposit is not disposed of. When springs 7 open indicating the coin magnet is operated the circuit to the lamp is extinguished and the operator may release the refund key. A collect operation is carried out in the same manner with the exception that the key is operated to its collect position and +110 volts forwarded to ionize lamp 499' and operate relay 490. The +110 volts is then forwarded on operation of relay 495 to the line conductors to operate the coin magnet to collect a deposited coin. The operator now removes her plug to release relay 430 as contacts 472 open to in turn release relay 460 which releases relay 440. The answer lamp may momentarily light as relay 460 releases before relay 440. Relay 460 on releasing close contacts 467 to complete a homing circuit for the motor magnet M.M. of switch 408 over contacts 487, 467, the off-normal springs O.N. and the motor magnet self-interrupter contacts. The motor magnet now steps its wipers home in a self-interrupted manner. Relay 370 is released as 380 was released by the subscriber and 440 is now released to open the circuits to relay 280 and it releases to open the circuit to relay 270 which restores slowly. At contacts 372 a circuit is completed over contacts 345, 331 and 271 for operating relay 230. Relay 230 operates as already described to hold relay 220 operated and maintain relay 390 operated but as relay 250 cannot be operated due to the coin disposal the circuit to relay 230 is shortly opened when relay 270 is restored so as it releases relay 220. It in turn releases relay 390. Thus high potential is not now sent out over the line for the purpose of coin disposal as relays 250 and 240 do not become energized. The +110 volt unlocking potential is now forwarded over lead A from contacts 281, 291, 276 and 226 to all locking relays to maintain these relays in their unlocked position.

During the time the called party is being rung relays 360 and 380 are released and relay 390 is operated as previously explained. A circuit is then completed to the operator's cord lamp (not shown) over contacts 363, 378 and 394 and lead CS so that the operator knows no one is on the line. Thus when either the calling or called party comes on the line between ringing operations when relays 485 and 210 are released a circuit is reestablished to relay 360 which in turn operates relay 380. The circuit to the cord lamp is opened at contacts 363 and the operator knows that someone is on the line with whom she must converse to determine who it is. The operator determines whether a call is completed between calling and called party line stations by listening. She may determine, when the call is terminated, by simply noticing when the cord lamp becomes lighted due to relay 360 releasing. As long as one of the party line stations is connected the operator may remove her plug from jack J1 without releasing any equipment as relays 360 and 380 are operated to maintain relays 370, 440, 460, 390, 280 and 270 operated. She may thus change plugs if necessary for any reason.

At the end of the conversation when both calling and called parties have released their connection, relay 360 releases to relight the cord lamp. The operator removes her plug. Relay 380 is restored. As contacts 472 open, relay 430 releases to open one circuit to relay 460 while at contacts 382 the other circuit to relay 460 is already opened. Motor magnet M.M. steps its wipers home on release of relay 460 as already described. Relay 440 is thus released to restore relay 370. The operator's answer lamp may light temporarily as relay 460 releases before 440. Relays 370 and 380 open the circuits to relay 280 and it restores to open the circuit to relay 270 which restores slowly. Relay 370 restoring before 270 completes a circuit to relay 230 over contacts 372, 345, 331 and 271. It operates to operate relay 220. Relay 270 now restoring does not open the circuit to the lower winding of relay 390 as it is held by ground at contacts 227 and conductor 307. The previously described automatic operation for applying +110 volt collect potential to the calling party's coin magnet to collect a coin is now performed by the repeater after which the various operated relays release as previously described.

*Toll calls*

A party at one of the pay stations such as P1 initiates a toll call by seizing the repeater 200 and selector 499 as previously described and dialling the digit zero on the selector to step the selector to its tenth position where its normal post springs close to send ground on lead EC for operating relay 440 as previously described. Relay 440 operates to signal the operator by lighting the lamp 471 and releases relay 450 which in turn releases the selector. The operator inserts her plug in jack J1 to operate the aforementioned relays and cause a deposit to be automatically refunded all as previously described. She converses with the calling party to secure the desired information and then extends a toll connection in any well-known manner to the desired called party and on securing the called party instructs the calling party to deposit the appropriate coin value before completing the talking circuit from repeating coil 402 through her cord circuit in any well-known manner. The operator identifies the amount deposited by the tones generated in coil transmitter 12 and sent over the trunk conductors −L and +L, the repeating coil 402 and the operator's receiver.

If this is a delayed toll call, wherein the operator cannot immediately secure the called party, she instructs the calling party to give her his number and hang up and also informs him that she will ring him when she secures the desired called party. When the calling party hangs up the cord lamp is lighted in a manner already explained to signal the operator that no one is on the line. The operator maintains relays 430, 460, 440, 390, 370, 280 and 270 operated as long as her plug is in jack J1. If she desires she may release the repeater by removing her plug to release the aforementioned relays so that calls may be established through the repeater and at some later time plug to operate those relays. She may now extend the connection over her cord circuit to the desired called party and on securing the same she instructs him to hold the connection until she gets the calling party. The operator operates her dial to apply battery over conductor R and operate relay 475 to in turn operate relay 260 while pulsing relay 485 to step switch 408 in accordance with the last digit of the calling party's number. Then she proceeds to signal the calling party in a manner similar to that described for securing a called party on a reverting call. When the calling party comes on the line her cord lamp is extinguished to signal her so, and she requests the deposit of the appropriate coin value which she may collect or refund in a manner previously described. After termination of the call, both the calling party and the operator release to release the repeater and it automatically collects any uncollected coins in a manner previously described on a reverting call.

On a regular toll call the calling party simply remains on the line and when the operator secures the called party she requests a deposit from the calling party before completing the connection through her cord circuit. She may of course collect or refund, if she wishes, however the repeater performs an automatic collect operation if a coin is on deposit in a manner already explained on release by both the calling party and the operator.

*Incoming calls*

A local subscriber such as S8 or an incoming toll operator extends a connection over the well-known Strowger type switching apparatus such as 399 to a battery searching connector such as 398. The connector 398 is operated by two dialled digits to find the repeater 200 and connect to leads EC′, the trunk conductors +L′ and −L′, and C′. The connector switch tests for battery over lead C′, contacts 378′, 278, 233 and through the lower winding of relay 340. If battery is found through the lower winding of relay 340, the switch through relay (not shown) of the connector switch is operated and lead C′ is grounded to operate relay 340 over the above circuit. Relay 340 at contacts 347 opens a point in the circuit to relay 460 and prevents the operator from interfering by plugging in to operate relay 460. At contacts 345 it opens a point in the circuit to relay 230, and at contacts 346 busies the trunk at the operator's position by lighting lamp 470 over lead B. Contacts 342 and 344 close to connect the +L′ and −L′ conductors respectively to conductors +L and −L respectively through contacts 213 and 223 and 211 and 221 respectively. In the meantime the third digit, dialled on the connector switch, results in the switch selecting the harmonic frequency individual to the called substation associated with the repeater 200, and as the connector switch through relay (not shown) is operated the ringing frequency is sent out over the −L′ conductor, contacts 342 and the already described portion of the ringing circuit and is returned over contacts 344 and the +L′ conductor to operate the ringer corresponding to 90 at the desired station and signal the called party. Simultaneously the ring back tone is returned to the calling party from the connector in the well-known manner. As previously mentioned the present invention is not limited to an arrangement utilizing a three digit connector such as described above, and it is here described only for the purpose of illustrating the manner of operation of the invention. When the called party removes his handset from the hookswitch, the substation ringer is cut-off at contacts 3, and a D.C. circuit for operating the connector ring cut-off relay (not shown) is completed through the already described paystation loop, excluding respectively contacts 341, coil 302, contacts 376, relay 360 and contacts 343 and 377 and including contacts 342, the −L′ lead to battery on one side of the cut-off relay and from ground on one side of said relay over the +L′ lead and contacts 344. The ring cut-off relay operates and extends the loop to operate the relay (not shown) for reversing battery on the trunk to the connector and also completes a talking circuit to the calling party. The parties may now converse.

Ground is in the meantime extended, over lead EC′ by the connector switch through relay (not shown), to battery through the lower winding of relay 330. It operates and completes a circuit for relay 290 over contacts 348, 335 and 284 so that relays 320, 280 and 270 operate as previously described to apply lock-out battery momentarily to the non-called stations. At contacts 332 it opens another point in the circuit to relay 460. The holding circuit for relay 280 is completed now over contacts 348, 335 and 283 as relays 370 and 410 are not operated. At contacts 334 ground is forwarded from lead EC′ to operate the upper winding of relay 340. Relay 330 closes contacts 333 to complete a circuit for its upper winding from contacts 274. Relay 270 opens the circuit to the lower winding of relay 340 at contacts 278, however it is held operated by the described circuit to its upper winding. Relay 270 also busies the repeater to incoming calls by ground forwarded over contacts 277 and 378′ to lead C′.

The release of the connection is under control of the calling party so that when the circuit to the line relay of the connector is opened by the calling party it releases. The called party line subscriber on replacing his handset only opens the circuit over the trunk conductors to the connector battery reversing relay. He cannot signal the operator. When the calling party releases the connecor, ground is removed from lead EC′ to deenergize the upper winding of relay 340 and the lower winding of relay 330. Relay 340 restores to open the circuit to relay 280 at contacts 348. It also reconnects the paystation circuit to coil 302 and relay 350 at contacts 341 and 343. Relay 350 cannot operate, however, as the coin springs are open and therefore it receives no operating ground. The upper winding of relay 330 remains energized, however over contacts 274 and 333, and it releases only when relay 270 releases to open contacts 274. Thus even after contacts 347 close, the operator cannot interfere until contacts 332 close. Relay 280 on releasing opens the circuit to relay 270 at contacts 312, and it releases to restore its contacts. Relay 230 is not operated, when contacts 331 close as contacts 271 are open. Therefore relay 220 is not operated and no coin operation is performed. Release of relay 270 does not recomplete a circuit to the lower winding of relay 340 as ground is already off lead C' and the repeater is now available to other callers. The operator's busy lamp 470 originally operated from contacts 346 is held operated only until relay 270 opens contacts 272. Contacts 281, 291, 276 and 226 are closed to connect lead A to +110 volt battery for unlocking all locked out stations.

In the case of a reverse charge call, the connection must be made through an operator having access to the repeater 200 from a jack such as J1. This is because she must control the connection through her cord circuit. The operator noticing the busy lamp 470 is extinguished plugs in at J1 to operate relay 460 in a manner previously described. Relay 440 operates to in turn operate relay 370. Relay 390 also operates to prepare for a collect operation. Relays 280 and 270 are operated in a manner previously described. The operator now dials and rings the called party in a manner already described. The called party on answering operates relay 360, 310 and 380 as previously described. The call is then completed when the called party deposits the proper coin value in a similar manner as an outgoing toll call. The call is later released and coins automatically collected as previously described.

I have described my invention in its particulars but because of its many applications, versatility, and breadth, what I think is the scope of my invention is incorporated in the following claims.

What is claimed is:

1. For use in a telephone system having a party line with paystations thereon each including a ringer operative responsive to an individually corresponding ringing frequency applied thereto and means individually associated with each of said stations and operated from said central office if its associated station is idle on initiation of a call from one of said stations and the deposit of a coin thereat for disabling the other stations, the improvement comprising a pair of conductors at a central office to which said partly line is connected, means operable over said conductors in response to the operation of dial equipment at said central office and in accordance with a digit dialled thereat for selecting a ringing frequency individual to one of the other stations on said line when a call from said one station is completed to a central office operator, and signal means operable over said conductors on operation of said dial equipment at said position for operating said disabling means at the other stations to enable the other stations and for applying said selected ringing frequency to said party line to signal one of the other stations by operating the ringer thereat corresponding to said selected frequency.

2. A system such as claimed in claim 1 in which said position includes coin control means associated therewith operable for either a collect or refund operation and in which said paystations each have a mechanism operable for disposing of a coin deposited thereat, and means including part of said signalling means operated on operation of said coin control means for operating the coin mechanism at one station to dispose of a coin deposited thereat.

3. For use in a telephone system wherein a group of paystations are connected to a central office by means of a common connection over which a call may be automatically completed to said stations each having disabling means, means operated over said connection by one station on initiation of a call and the deposit of a coin for operating the disabling means at the other stations whereby they are disabled, conductors over which an operator at said position has access to said common connection for the purpose of conversing with said calling station in response to a call, means operated on answer by said operator on a call thereto for automatically causing a coin deposited at said one station to be refunded, and means automatically operated in response to a digit dialled over said conductors and a circuit thereafter completed over one of said conductors by said operator for causing only one of said other stations to be signalled.

4. For use in a telephone system wherein a group of paystations are connected to a central office by means of a common circuit over which a connection may be automatically completed from one of said stations for signalling an operator's position having access to sources of different ringing frequencies, said stations each having disabling means, coin receiving, refunding and collecting means and means operated responsive to the application of an individually corresponding frequency for signalling its associated station, the improvement comprising means operated over said circuit by said one station for operating the disabling means at the other stations whereby they are disabled, means at said position automatically operated on answer by an operator thereat on being signalled for operating the refunding means to refund a coin deposited at said one station, conductors over which the operator at said position has access to said common circuit for the purpose of conversing with said calling station, means operated over said conductors for operating said disabling means at the other stations to enable the other stations to be signalled, and means automatically operated in response to the operation of said last operated means for signalling one of said other stations to thereby enable a call to be completed between two of said stations.

5. For use in a telephone system wherein a group of paystations each having means operative responsive to an individually corresponding current frequency for signalling its associated station are connected to a central office by means of a common connection over which a call may be automatically completed to an operator's position, said stations each having disabling means, means operated over said connection by a calling one of said stations for operating the disabling means at the other stations whereby the non-calling stations are disabled, a pair of conductors over which the operator at said position has access to said common connection for the purpose of conversing with said calling station, a switch associated with a plurality of sources of different current frequencies, a relay associated with one of said conductors and operated over said one conductor on the dialling of a digit at said position corresponding to one of said stations, another relay associated with the other conductor by said first relay for reproducing said digit to operate said switch accordingly and select one of said sources of current frequencies, and means thereafter associated with said other conductor and operated thereover from said position for operating said disabling means to enable the other stations and for applying said selected current frequency thereto to operate a corresponding one of said means responsive to an individual frequency current for signalling its associated station.

6. For use with a telephone system wherein a central office having an operator's position including an impulse sender, a plurality of sources of different ringing frequencies and means operable for controlling a coin refund or collect operation is connected to a party line having paystations thereon each equipped with a disabling means, the improvement comprising means operated on initiation of a call from one of said stations and on the deposit of a coin thereat for signalling said position, said disabling means at the other stations operated thereby to disable said other stations, means at said position automatically operated on answer by an operator at said position for controlling a coin refund at said one station and for automatically establishing a talking circuit between said position and said station for enabling said operator to request the deposit of another coin in said receiving means, said coin control means operated over a portion of said talking circuit for collecting said other coin, means operable over a portion of said talking circuit in response to a digit dialled on said impulse sender at said position for selecting one of said sources of ringing frequency corresponding to a desired one of said other stations, and means operable over a portion of said talking circuit for operating said disabling means to enable said other stations and for applying said selected frequency to said line to signal said one other station which is now enabled to receive said ringing frequency.

7. For use in a telephone system wherein a central office is connected to a party line with paystations thereon, each station having means associated therewith for disabling said station, a ringer responsive to an individually corresponding frequency for signalling its associated station, and means at said central office operated in response to the initiation of a call from one station and deposit of a coin thereat for operating said disabling means at the other stations to disable the other stations from interfering with a call or being signalled, the improvement comprising a pair of conductors at said position, means thereat associated with said conductors operated on answer by an operator at said central office in response to said central office being signalled on a call thereto for automatically applying a potential of one polarity to said line for refunding a coin at said one station and for thereafter establishing a talking connection between said one station and said position over said conductors, means operated over said conductors by equipment at said central office to select a ringing frequency corresponding to the individual ringing frequency of the ringer at one of the other stations, means thereafter operated over said conductors after operation of said ringing equipment for operating all said disabling means at the non-calling other stations to enable the other stations and for applying thereto said selected ringing frequency to operate the ringer at only one of the other stations to signal said one other station, and means thereafter operable over said conductors by said coin control means for applying a potential of another polarity for collecting another coin deposited at said one station.

8. In a telephone system, a line having a plurality of stations connected thereover to an operator's position, means associated with said line for extending connections therefrom to other lines or for signalling the operator at said position when it is desired to call another station on the same line, a plurality of sources of ringing current, one for each station on the line, a selecting switch individual to said line, means controlled by an operator at said position for operating said switch for selecting a ringing frequency individual to the desired called station and applying it to the line to signal the desired party, means responsive to the initiation of a call from one station for locking out all other stations, and means controlled by the operator for rendering said lock-out means ineffective to enable her to apply said ringing frequency to signal the called station.

9. In a telephone system, a line having a plurality of paystations connected in common to an operator's position at a central office and having means associated therewith for extending connections therefrom or for signalling said operator's position when desired on initiation of a call from one of said stations and the deposit of a coin thereat, means at said central office operated on initiation of a call from said one station for operating said disabling means at the other stations to disable said other stations, a pair of conductors at said position for establishing a talking connection to said calling station, means associated with said conductors operated on answer by the operator for refunding a coin deposited at said station, means thereafter operable over one of said conductors for operating said disabling means to enable said other stations, and means operable over said one conductor for disposing of another coin deposited at said station.

10. For use in a telephone system having a party line with stations thereon each having means responsive to an individually corresponding ringing frequency for signalling its associated station, means individually associated with each of said stations and operated from a central office if its associated station is idle on the initiation of a call from one of said stations for disabling its associated station, conductors at said central office, and control means operated over said conductors in accordance with a digit dialled at said central office for selecting a ringing frequency individually corresponding to one of said means responsive thereto, said operated control means operating said disabling means at each other station to enable the other stations and applying the selected ringing frequency to said party line to operate the means responsive thereto at one of the other stations to signal that station.

References Cited in the file of this patent

UNITED STATES PATENTS

| | | |
|---|---|---|
| 1,133,113 | Dunbar | Mar. 15, 1915 |
| 2,001,095 | Deakin | May 14, 1935 |
| 2,180,963 | Pearce | Nov. 21, 1939 |
| 2,245,799 | McClew et al. | June 17, 1941 |
| 2,355,139 | Bellamy | Aug. 8, 1944 |
| 2,367,769 | Goddard | Jan. 23, 1945 |
| 2,543,062 | Ringkjob | Feb. 27, 1951 |

UNITED STATES PATENT OFFICE
CERTIFICATE OF CORRECTION

April 21, 1959

Patent No. 2,883,462

Robert P. Dimmer

It is hereby certified that error appears in the printed specification of the above numbered patent requiring correction and that the said Letters Patent should read as corrected below.

Column 18, line 3, after "to" insert -- an operator's position, --.

Signed and sealed this 1st day of September 1959.

(SEAL)
Attest:

KARL H. AXLINE
Attesting Officer

ROBERT C. WATSON
Commissioner of Patents